United States Patent Office 3,686,084
Patented Aug. 22, 1972

3,686,084
INITIATORS FOR THE PHOTOPOLYMERISATION OF UNSATURATED COMPOUNDS
Hans-Jürgen Rosenkranz, Krefeld, Hans Rudolph, Krefeld-Bockum, and Hans-Georg Heine, Krefeld, Germany, assignors to Farbenfabriken Bayer Aktiengesellschaft, Leverkusen, Germany
No Drawing. Filed Sept. 14, 1970, Ser. No. 72,104
Claims priority, application Germany, Sept. 27, 1969,
P 19 49 010.9
Int. Cl. C08f 1/20
U.S. Cl. 204—159.15        8 Claims

ABSTRACT OF THE DISCLOSURE

The invention relates to unsaturated polymerisable compounds and mixtures of such compounds admixed with benzophenones each of the two nuclei of which being substituted by a halogenated methyl group. If said compositions are irradiated by ultraviolet light, the benzophenone derivatives split off free radicals which initiate the polymerisation of the unsaturated compounds.

---

It is known that the photopolymerisation of unsaturated compounds can be substantially accelerated by initiators. The compounds hitherto used for this purpose have repeatedly been dealt with in summarizing publications, for example, by Ch. M. McClosky and J. Bon [Ind. and Eng. Chem., 47, 2125 (1955)] and G. Delzene [Ind. Chim. Belg., 24, 739 (1959)]. A characteristic feature of the known photo-initiators is their high substrate specificity.

The subject-matter of the invention is the use of halomethylated benzophenones of the formula.

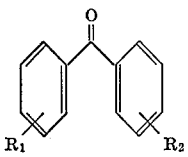

in which $R_1 = CH_2—X$, $CH—X_2$, $CX_3$;
$R_2 = H$, $CH_3$, $CH_2—X$, $CH—X_2$, $CX_3$;
X = chlorine, bromine or iodine, as initiators for the photopolymerisation of unsaturated compounds.

Examples of such benzophenone derivatives are: p-benzoyl benzyl chloride, p-benzoyl-benzal chloride, p-benzoyl benzotrichloride, p-benzoyl benzyl bromide, p-benzoyl-benzal bromide, p-benzoyl benzotribromide, 4,4'-bis-chloromethyl-benzopheone, 4,4'-bis-dichloromethyl-benzophenone, 4,4'-bis-trichloromethyl-benzophenone, 4,4'-bis-bromomethyl-benzophenone, 4,4'-bis-dibromomethyl-benzophenone, 4,4'-bis-tribromomethyl-benzophenone and o-benzoyl benzotrichloride. Mixtures of these compounds can also be used.

These compounds are primarily characterised by their universal applicability and by their high reactivity to all photo-polymerisable substances, especially under the influence of longwave ultraviolet light. In general, they are used in amounts of about 0.1 to about 10, preferably of about 0.5 to about 2 percent by weight based on the unsaturated compounds. The most effective rays for initiating the polymerisation are those with wave lengths from 2500 to 4000 A. Suitable light sources, besides sunlight, are therefore mainly mercury, tungsten and xenon lamps as well as certain fluorescent lamps.

Suitable unsaturated compounds which can excellently be photopolymerised with these initiators are, for example, methacrylic acid esters, vinyl esters, vinyl halides, vinyl ketones, vinyl ethers, vinyl cyanides, vinylidene halides and styrene, and also mixtures of different monomers and mixtures thereof with unsaturated polyesters containing radicals of α,β-unsaturated dicarboxylic acids and possibly allyl ether groups. p-Benzoyl benzyl bromide has proved particularly satisfactory in the photochemical hardening of such mixtures.

The photopolymerisation can be carried out in substance, in solution or as emulsion polymerisation. Preferred fields of application are, for example, the production of coatings on various substrates, such as wood, metal, synthetic materials and textiles, as well as the reinforcement of fibre fleeces.

EXAMPLE 1

Batches of 10 g. of a 0.05-molar solution of the initiators in methyl acrylate are illuminated in test tubes for 30 minutes with ultraviolet light of a wave length of ≥3200 A. Gravimetric determination of the polymer content in the samples gives the following values:

|   | Percent polymer |
|---|---|
| p-Benzoyl benzyl bromide | 15.1 |
| p-Benzoyl benzotrichloride | 14.4 |
| 4,4'-bis-bromomethyl-benzophenone | 25.8 |
| Phenacyl bromide (control example) | 11.2 |

EXAMPLE 2

Batches of 20 g. of a 0.05-molar solution of the initiators in ethyl acrylate are exposed in glass beakers to the light of a fluorescent tube (Osram L 40 W/70-1) placed at a distance of 10 cm. The content of the glass beakers solidifies to form a solid mass after the following periods of time:

| | |
|---|---|
| 4,4'-dibromomethyl-benzophenone | 1 hour 30 min. |
| 4,4'-bis-dibromomethyl-benzophenone | 1 hour 50 min. |
| p-Benzoyl benzotrichloride | 2 hours 10 min. |

EXAMPLE 3

A needled fibre fleece (200 x 150 mm.) of polyamide-6 fibres is impregnated with a benzenic solution containing, per 1000 parts by weight, 30 parts by weight acrylic acid butyl ester, 30 parts by weight butane-diol-1,4-bis-acrylate and 6 parts by weight p-benzoyl benzotrichloride. The solution solidifies when cooled very fast on a surface having a temperature of −40° C. At −10° C. the material is illuminated from a distance of 5 cm. for 15 minutes with 2 fluorescent tubes (Osram L 40 W/70-1) and a Philips high pressure mercury burner (HPK/125 W). After melting the solvent, this is squeezed off and the fleece is air-dried. The fleece thus treated still has a good permeability to air and a soft suede-like feel.

EXAMPLE 4

An unsaturated polyester prepared by polycondensation of 152 parts by weight maleic acid anhydride, 141 parts by weight phthalic acid anhydride and 195 parts by weight propane-diol-1,2, is mixed with 0.045 part by weight hydroquinone and dissolved in styrene to give a 65% by weight solution. 100 parts by weight of this resin supply form are admixed with 2 parts by weight p-benzoyl benzyl bromide, 20 parts by weight styrene and 1 part by weight of a 10% by weight solution of paraffin (M.P. 52–53° C.) in toluene. This solution is applied to a glass plate by means of a film extruder (500μ) and illuminated with a fluorescent lamp (Osram L 40 W/70-1) from a distance of 5 cm. The film exhibits a paraffin floating time of 56 seconds and reaches its final hardness (>pencil hardness 6 H) after 11 minutes.

What we claim is:
1. A composition comprising a photopolymerizable unsaturated compound having admixed therewith, as a photo-polymerization initiator, about 0.5 to about 2.0% by weight, based on the weight of the unsaturated compound, of at least one benzophenone derivative of the formula

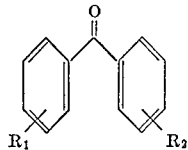

wherein $R_1$ is $CH_2X$, $CHX_2$ or $CX_3$; $R_2$ is H, $CH_3$, $CH_2X$, $CHX_2$ or $CX_3$ and X is chlorine, bromine or iodine.

2. The composition according to claim 1 in which X is chlorine or bromine.

3. The composition according to claim 2 in which the benzophenone derivative is p-benzoyl benzyl chloride, p-benzoyl-benzal chloride, p-benzoyl benzotrichloride, p-benzoyl benzyl bromide, p-benzoyl-benzal bromide, p-benzoyl benzotribromide, 4,4' - bis - chloromethyl-benzophenone, 4,4'-bis-dichloromethyl-benzophenone, 4,4'-bis-trichloromethyl - benzophenone, 4,4' - bis-bromomethyl-benzophenone, 4,4'-bis-dibromomethyl-benzophenone, 4,4'-bis-tribromomethyl-benzophenone or o-benzoyl benzotrichloride.

4. The composition according to claim 1 in which the content of the benzophenone derivate is from about 0.5 to about 2% by weight based on the unsaturated compound.

5. The composition according to claim 1 in which the unsaturated compound is a methacrylic acid ester, vinyl ester, vinyl halide, vinyl ketone, vinyl ether, vinyl cyanide, vinylidene halide or styrene.

6. The composition according to claim 1 in which the unsaturated compound is a polyester containing $\alpha,\beta$-unsaturated dicarboxylic acid moieties, said polyester being in admixture with a copolymerisable monomeric compound.

7. A method of producing a polymeric composition which comprises exposing a composition according to claim 1 to ultra-violet light.

8. A method according to claim 7 in which the ultra-violet light comprises light of a wavelength of 2500 to 4000 A.

References Cited
UNITED STATES PATENTS

| | | | |
|---|---|---|---|
| 3,556,791 | 1/1971 | Suzuki et al. | 96—35.1 |
| 3,387,035 | 6/1968 | Gray et al. | 260—591 |
| 3,582,487 | 6/1971 | Fuhreb et al. | 204—159.23 |

JOHN C. BLEUTGE, Primary Examiner

U.S. Cl. X.R.

96—115 P; 204—159.23